UNITED STATES PATENT OFFICE.

E. F. FRENCH, OF NEW YORK, N. Y.

IMPROVEMENT IN CORN-HUSKERS.

Specification forming part of Letters Patent No. 47,710, dated May 16, 1865.

*To all whom it may concern:*

Be it known that I, E. F. FRENCH, of the city, county, and State of New York, have invented a new and Improved Corn-Husking Machine; and I do hereby declare that the following is a full, clear, and exact description thereof, which will enable others skilled in the art to make and use the same, reference being had to the accompanying drawings, forming part of this specification, in which—

Figure 1 is a vertical section of my invention, taken in the line $x$ $x$, Fig. 2; Fig. 2, a side view of the same.

Similar letters of reference indicate like parts.

This invention relates to a new and improved machine for husking corn of that class in which rollers are employed to effect the object. In the original machine of this kind the corn-husks are liable to wind around the rollers while the latter are stripping the husks from the ears, and thereby render the machine very inefficient—a difficulty which is fully obviated by my improvement.

A represents a framing, in the upper part of which there is a box, B, having a roller, C, at one end, directly underneath which there is a roller, D, provided with longitudinal plates or flanges $a$. These rollers C D are designed for detaching the ears of corn from the stalks, and are the same as those previously used.

The stalks are placed on a feed-board, E, on the framing, and pass between the rollers C D, the detached ears falling into the box B. This box B has an inclined bottom, $b$, which admits of the discharge of the ears through an opening, $c$, in the side of the box, the ears passing on or between rollers F F, which are rotated in the direction indicated by the arrows 1, and draw or strip the husks from the ears, the latter dropping off from the rollers, the axis of which are in an inclined plane to admit of that result, as shown in Fig. 1.

Underneath each roller F there is an upright plate or scraper, G. The upper edges of these plates are serrated or notched, as shown at $d$, and they set closely to the rollers and effectually prevent the husks from wrapping or winding around them, and thereby render the machine perfect in its operation.

I do not claim the rollers C D for separating or detaching the ears from the stalks, nor do I claim the stripping of the husks from the ears by means of rollers F F, for these devices have been previously used for the purpose; but I do claim as new and desire to secure by Letters Patent—

The employment or use of the plates or scrapers G, in connection with the rollers F F, arranged and applied to operate substantially as and for the purpose herein set forth.

E. F. FRENCH.

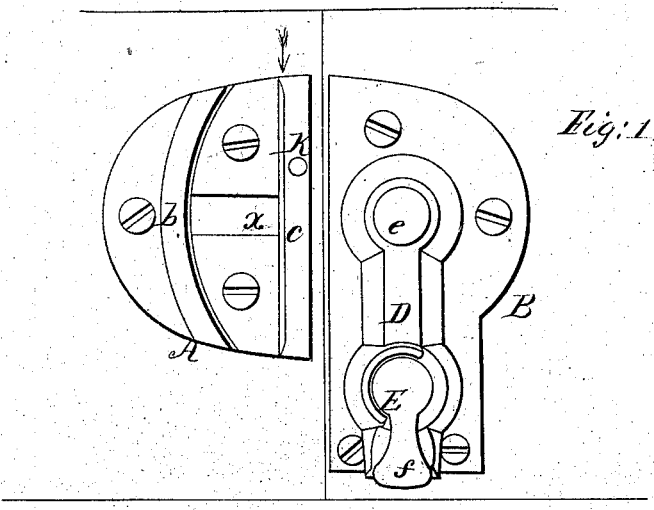
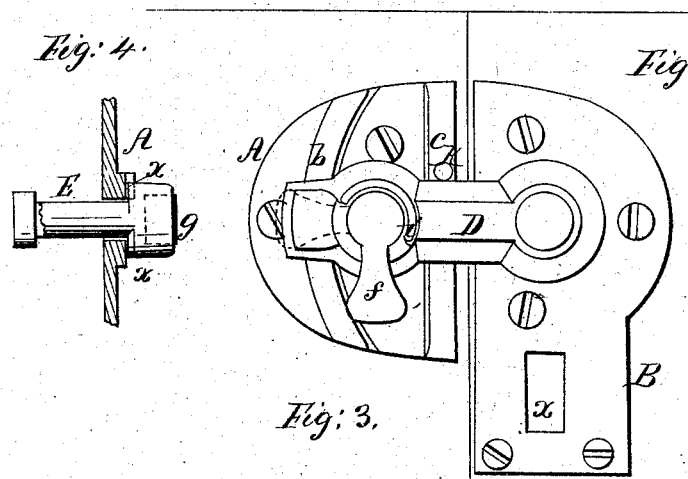
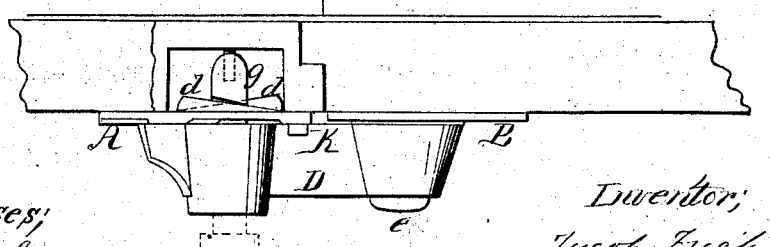

Witnesses:
   M. M. LIVINGSTON,
   C. L. TOPLIFF.